United States Patent [19]

Figueroa

[11] Patent Number: 5,050,342
[45] Date of Patent: Sep. 24, 1991

[54] MULTI-PURPOSE RECEPTACLE

[76] Inventor: Luisito A. Figueroa, 183 Sinag St., Mandaluyong, M.M., Philippines, 1501

[21] Appl. No.: 617,390

[22] Filed: Nov. 19, 1990

Related U.S. Application Data

[63] Continuation of Ser. No. 370,259, Jun. 16, 1989, abandoned.

[51] Int. Cl.⁵ .............................................. A01G 9/02
[52] U.S. Cl. .......................................... 47/66; 29/432; 29/416
[58] Field of Search ............. 52/DIG. 9; 29/432, 416; 220/677, 692, 5 R; 47/34

[56] References Cited

U.S. PATENT DOCUMENTS

| | | | |
|---|---|---|---|
| 2,140,996 | 12/1938 | Heifetz | 47/66 |
| 3,621,611 | 10/1970 | Wingerter | 47/66 |
| 4,785,577 | 11/1988 | Lederbauer | 47/33 |
| 4,932,157 | 6/1990 | Shimp | 47/25 |

Primary Examiner—David A. Scherbel
Assistant Examiner—Michele A. Van Patten
Attorney, Agent, or Firm—Julian Caplan

[57] ABSTRACT

A multi-purpose receptacle of the type utilizing discarded pneumatic tire of a motor vehicle is disclosed. This receptacle comprises an annular body defining an upper tread portion, a sidewall converging downwardly from said upper tread portion, a supporting rim terminating at the lower end of said sidewall, a bottom wall secured within the lower end of said sidewall, and jointing means connecting the free ends of said body.

7 Claims, 2 Drawing Sheets

MULTI-PURPOSE RECEPTACLE

This is a continuation, of application Ser. No. 370,259 filed June 16, 1989, now abandoned.

The present invention broadly relates to improvements and/or innovations in the field of receptacle construction. More particularly, it relates to a multi-purpose receptacle which could be appreciably used as a plant or flower pot or stand, a floor-type ash tray, a waste basket, etc., said receptacle being preferably formed by utilizing the discarded worn-out and old pneumatic tires of the conventional motor vehicles.

The conventional receptacle for plant or flower consists essentially of a round vessel which is usually made of metal or earthenware. While generally accepted with satisfaction, this conventional receptacle has many pronounced disadvantages. Being made of metal or earthenware, it can not withstand prolonged use. Further, these structures entail excessive expense and laborious steps in manufacturing thereof.

In the rubber tire industries, the disposal of millions of worne or old tires have been a paramount problem. Some of these tires are recycled for use as playground equipment. Some are ground up, and the rubber is reclaimed for use in new rubber products or used in asphalt for paving. Still others are used as artificial reefs on ocean bottoms to provide havens for fish or, as a shock absorber on the side of the ships, boats, etc. Another method of disposing tires is to use them as a source of energy by burning them to produce a synthetic rubber fuel containing an oxygen-rich chemicaly used in rockets. But this method is extremely costly.

Research in this field has established a fact that disposable pneumatic tires such as those used in automobile, trucks and buses, when cut in a predetermined dimension could be formed and fashioned in highly durable and decorative multi-purpose receptacle.

It is therefore the most important object of the invention to provide a receptacle which has a body preferably formed from discarded motor vehicle tire.

Another object of the invention is provide a receptacle which make use of the old and worn pneumatic tires into a new perspective of use and thereby additionally enhance the disposition thereof.

Still another object of the invention is to provide a receptacle that could be readily produced in various decorative pattern of design that has heretofore been attained in the art of receptacle production.

A futher object of the invention is to provide a receptacle that is very simple and easy to construct, inexpensive to produce, sustain prolong usage and appreciably decorative.

The objects of the invention, and its characteristic features and advantages will be further seen in the description which follows, give by way of example, with reference to the accompanying drawing, in which.

Figure 1:
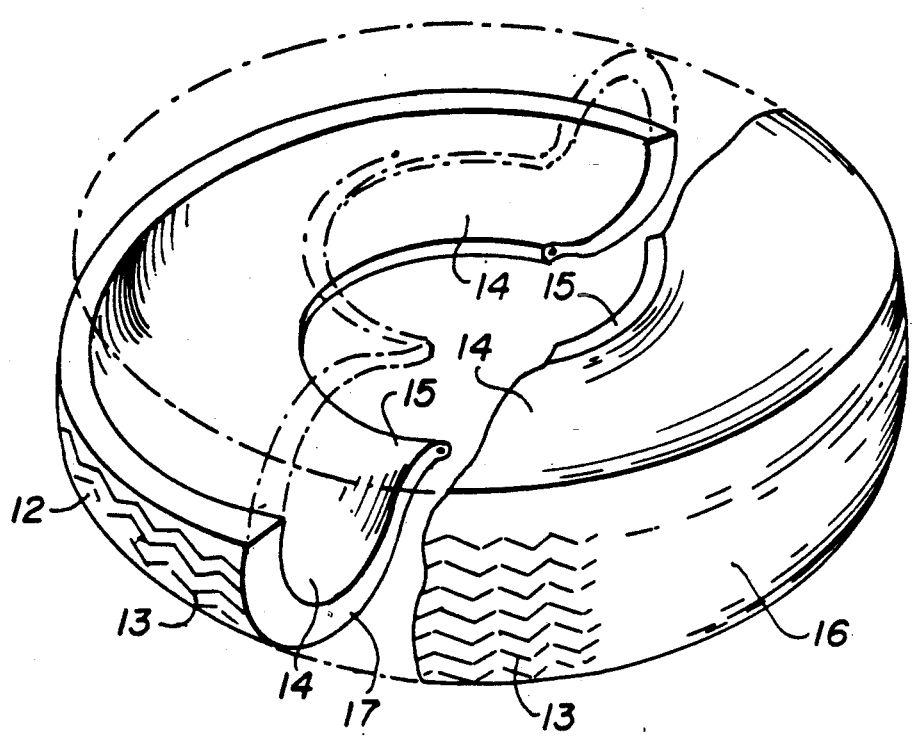
FIG. 1 is a fragmentary perspective view of a tire carved-out from a conventional worn and old motor vehicle pneumatic tires as used in the invention.
Figure 2:
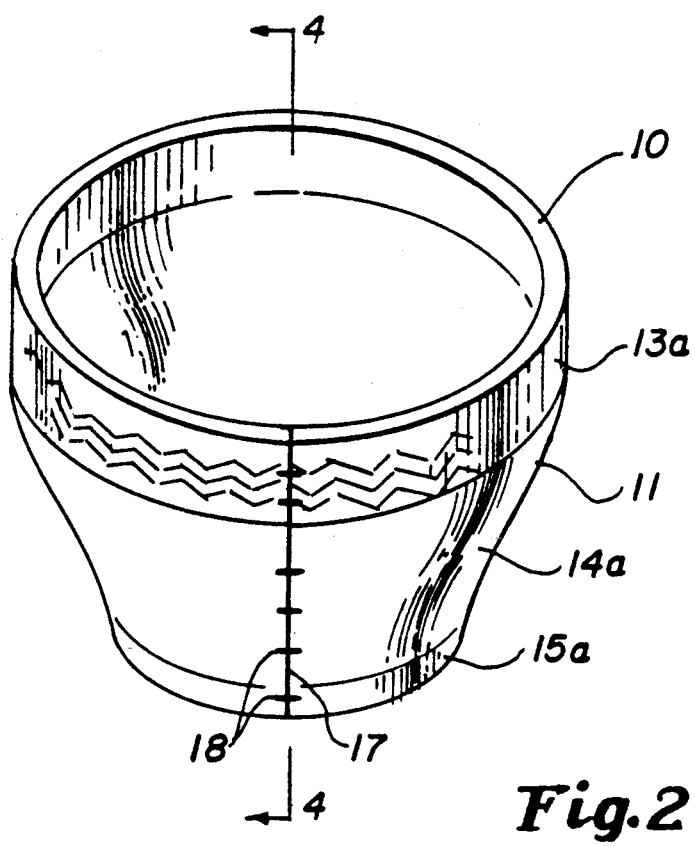
FIG. 2 is a perspective view of the multi- purpose receptacle formed from the carved-out tire as shown in FIG. 1 and embodying the invention.

Referring now in greater detail to the several views of the drawing and wherein like reference numerals designate the same parts throughout, there is shown in FIG. 2 a multi- purpose receptacle generally designated by reference numeral 10. This receptacle 10 comprises an annular body 11 that is fashioned and formed from a unitary piece 12 carved-out from a conventional pneumatic tire as shown in FIG. 1. As in conventional arrangement, said unitary piece 12 basically defines an outer circumferential tread member 13, a sidewall 14 converging with the said tread member 13, and a retaining metal wheel rim 15 integrally formed at the terminal of said sidewall 14. As shown in FIG. 1, it may be noted that said unitary piece 12 has been carved out from the original form of the conventional pneumatic tire 16 in a predetermined dimension. In this case, it is shown to be about one-fourth of said pneumatic tire 16 although other dimension could be achieved if desired.

In operation, said unitary piece 12 as shown in FIG. 1 is formed by first slicing off a section of the tire 16 along the circumferential axis thereof and severing it transversely. The opposed free ends 17 is then joined by suitable metallic straps or fasterners 18 although it could also be secured together by seams or other jointing structures. Preferably, the lineal length of the unitary piece 12 ranges one-eight to at least one- half of the circumferencial length of the pneumatic tire 16.

Figure 3:
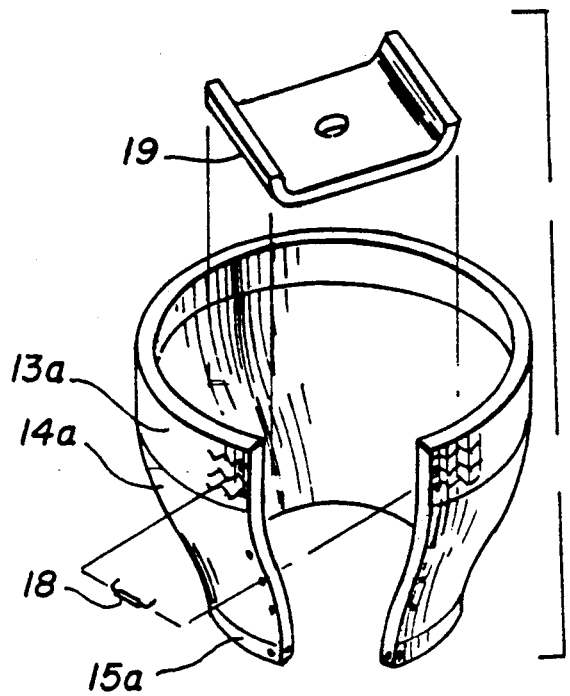
FIG. 3 is an exploded view of the receptacle shown in FIG. 2.
Figure 4:
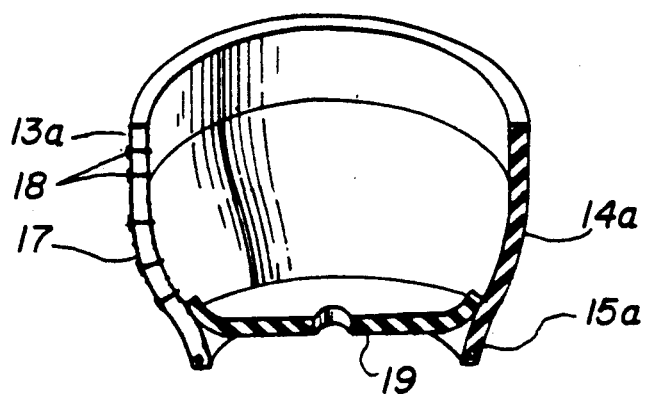
FIG. 4 is a central cross-sectional view taken along line 4—4 of FIG. 2.

As illustrated in FIGS. 2 to 4, the body 11 of the assembled receptacle now consists of an upper tread portion 13a, an annular sidewall 14a converging downwardly from said upper tread portion 13a, and a metal-reinforced 15a terminating at the lower end of said sidewall 14a. Disposed within the lower portion of the sidewall 14a is a bottom wall 19. It is perferred that this bottom wall 19 also be made of discarded pneumatic tire material although wood or other suitable structure could also be used.

Figure 5:
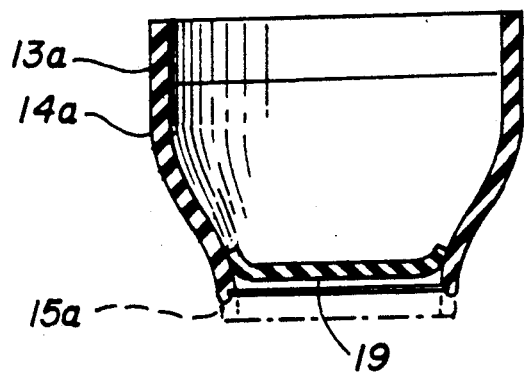
FIG. 5 is a central cross-sectional view of an another embodiment of the receptacle as shown in FIG. 4.

In an alternative embodiment as shown in FIG. 5, the rim 15a being reinforced with metallic material has been removed to facilitate easy formation of the desired shape.

I claim:

1. A multi-purpose receptacle formed from a vehicle tire of the type having a circumferential central tread portion, side wall portions on either side of said tread portion, and terminal wire-reinforced beads to engage a wheel rim on the edges of said side walls opposite said tread portion and wherein said tire has been cut with a first cut perpendicular to the axis of rotation of said tire through the middle of said tread portion and cut transversely in two second cuts perpendicular to said first cut, said receptacle comprising a hollow body, said body having two ends formed by said second cuts, means joining said two ends together to form a body of substantially lesser circumference and radius than said tire, said body having a substantially cylindrical upper portion formed by the portion of said tread portion bounded by said first and second cuts, a downward converging lower portion below said upper portion formed by one said side wall portion and a bottom edge below said lower portion formed by one said terminal bead, and a bottom wall having a disk and edges around said disk, said edges engaging the inside of said lower portion to close off the bottom of said body.

2. A receptacle according to claim 1 in which said bottom wall is formed from a portion of said tire discrete from said body.

3. A receptacle according to claim 1 in which said means joining said two ends comprises plural metallic fasteners through said body.

4. A method of forming a multi-purpose receptacle comprising providing a vehicle tire of the type having a circumferential central tread portion, and side wall portions on either side of said tread portion and terminal wire-reinforced beads to engage a wheel rim on the edges of said side wall portions opposite said tread portion, making a first cut through said tire approximately in the middle of said tread portion perpendicular to the axis of rotation of said tire, making a second cut through said tire perpendicular to said first cut to form a first end, making a third cut through said tire perpendicular to said first cut to form a second end, joining said first and second ends together to form a body of substantially lesser circumference and radius than said tire, said body having a substantially cylindrical upper portion formed by the portion of said tread portion bounded by said first cut and one said side wall portion and a downward converging lower portion below said upper portion formed by said one side wall portion and a bottom edge formed by one said terminal bead, providing a disk having side edges and inserting said disk in said body, said side edges engaging the inside of said lower portion to close off the bottom of said body.

5. The product of the method of claim 4.

6. A method according to claim 4, in which said bottom wall is cut from a portion of said tire discrete from said body.

7. A method according to claim 4 in which the length of said body is between one-eighth and three-quarters of the circumference of said tire.

* * * * *